(12) United States Patent
Machida et al.

(10) Patent No.: US 7,171,549 B2
(45) Date of Patent: Jan. 30, 2007

(54) INFORMATION PROCESSING APPARATUS FOR START-UP OF AN OPERATING SYSTEM USING THREE DIFFERENT INITIALIZATION MODES IN A SPECIFIC SEQUENCE

(75) Inventors: Hiroyuki Machida, Kanagawa (JP); Takao Shinohara, Kanagawa (JP); Kiyoshi Owada, Osaka (JP); Tetsuji Yamamoto, Osaka (JP); Katsushige Amano, Kyoto (JP)

(73) Assignees: Sony Corporation, Tokyo (JP); Matsushita Electric Industrial Co., Ltd., Kadoma (JP)

( * ) Notice: Subject to any disclaimer, the term of this patent is extended or adjusted under 35 U.S.C. 154(b) by 463 days.

(21) Appl. No.: 10/745,513

(22) Filed: Dec. 29, 2003

(65) Prior Publication Data

US 2004/0139439 A1 Jul. 15, 2004

(30) Foreign Application Priority Data

Jan. 8, 2003 (JP) ............................. 2003-002119

(51) Int. Cl.
*G06F 15/177* (2006.01)
(52) U.S. Cl. ........................................................ 713/1
(58) Field of Classification Search ..................... 713/1
See application file for complete search history.

(56) References Cited

U.S. PATENT DOCUMENTS 6,038,632 A 3/2000 Yamazaki et al.
6,098,158 A * 8/2000 Lay et al. .................... 711/162
6,367,074 B1 * 4/2002 Bates et al. .................. 711/170
6,374,353 B1 4/2002 Settsu et al.
6,434,696 B1 * 8/2002 Kang ............................. 713/2
6,631,469 B1 * 10/2003 Silvester ......................... 713/2
6,839,836 B2 * 1/2005 Cole et al. ...................... 713/2
6,928,542 B2 * 8/2005 Wen et al. ...................... 713/2
2002/0169949 A1 11/2002 Shenassa et al.
2004/0260956 A1 * 12/2004 Pagan .......................... 713/300

FOREIGN PATENT DOCUMENTS

JP 2000-293391 * 10/2000

* cited by examiner

*Primary Examiner*—Chun Cao
(74) *Attorney, Agent, or Firm*—Oblon, Spivak, McClelland, Maier & Neustadt, P.C.

(57) ABSTRACT

To start up an operating system (OS), CPU performs initializations in three modes: The three modes include a first I/O initialization (Early init) (132) which is to be done serially when no threads are yet usable, without any advanced technique and with a long wait time until a next operation can be made; a second I/O initialization (136) which is to be done when threads are usable, in a plurality of steps parallelized with each other using the usable threads according to the dependency relation between devices to be initialized and with synchronization between the steps each by a barrier; and a third I/O initialization (Lazy init) (140) in which remaining initializations are done in parallel with each other using the threads commensurately to a user process when the user process becomes executable. The present invention is applicable to home-use electric or electronic appliances.

18 Claims, 18 Drawing Sheets

| | SYSTEM STATE | | | | INITIALIZE MODE | | |
|---|---|---|---|---|---|---|---|
| | INTR | SLEEP | THREAD | | SEQUENTIAL | PARALLEL | LAZY |
| A | NA | NA | NA | | — | — | — |
| B | ○ | ○ | NA | | ○ | — | — |
| C | ○ | ○ | ○ | | — | ○ | — |
| D | ○ | ○ | ○ | | — | — | — |
| USER PROCESS | | | | | — | — | ○ |

KERNELS: A, B, C, D

```
early_init_entry_number=N    /*NO. OF ENTRIES IN EARLY REGISTRY:N*/
for(i=1;<=N;i++){
    early_init_entry[i]()
}
  . . /*THREAD INITIALIZE*/
  . . /*SCHEDULER INITIALIZE*/
  . . /*PARALLELIZATION INITIALIZE*/
  . .
  .

phase_number=M    /*NO. OF PHASES:M*/
for(i=0;i<M;i++){
    phase[i]_number=P    /*NO. OF PHASES IN PHASE [I]:P*/
    for(j=1;j<=P;j++){
        create_exec_thread(phase[i][j])    /*THREAD GENERATE*/
    }
    wait_all    /*SYNC BY BARRIER*/
}

Lazy_number=Q    /*NO. OF ENTRIES IN LAZY REGISTRY:Q*/
for(i=1;i<=Q;i++){
    create_exec_thread(Lazy[i])    /*THREAD GENERATE*/
}
```

| REGISTRY NAME | NO. | INIT TO BE DONE |
|---|---|---|
| Early | 1 | hdd_early_init |
| phase0 | 1 | SCSI_CHIP_init |
|  | 2 | USB_CHIP_init |
| phase1 | 1 | USB_MASS_Storage_init |
|  | 2 | USB_Serial_init |
| phase2 | 1 | SCSI_BUS_init |
|  | 2 | KBD_init |
|  | 3 | Mouse_init |
|  | 4 | Infrared_init |
| phase3 | 1 | SCSI_DISK_init |
| Lazy | 1 | hdd_lazy_init |

FIG.12

```
170 hdd_early_init()
{
    power_register=1
}
hdd_lazy_init()
{
    if(!ready)
        sleep(sync)
    issue prove cmd
    sleep(sync)
        ⋮
}
```

171 = hdd_early_init block
172 = hdd_lazy_init block

FIG. 13

|  | | SYSTEM STATE | | | INITIALIZATION METHOD |
|---|---|---|---|---|---|
|  | | INTR | SLEEP | THREAD | NEW |
| KERNELS | A | NA | NA | NA | ○ |
| | B | ○ | ○ | NA | ○ |
| | C | ○ | ○ | ○ | ○ |
| | D | ○ | ○ | ○ | ○ |
| USER PROCESS | | | | | ○ |

| ENTRY NAME | NO. | INIT TO BE DONE |
|---|---|---|
| Early | 1 | hdd_early_init |
| phase0 | 1 | SCSI_CHIP_init |
|  | 2 | USB_CHIP_init |
| phase1 | 1 | USB_MASS_Storage_init |
|  | 2 | USB_Serial_init |
| phase2 | 1 | SCSI_BUS_init |
|  | 2 | KBD_init |
|  | 3 | Mouse_init |
|  | 4 | Infrared_init |
| phase3 | 1 | SCSI_DISK_init |
| Lazy | 1 | hdd_lazy_init |

FIG. 16

INFORMATION PROCESSING APPARATUS FOR START-UP OF AN OPERATING SYSTEM USING THREE DIFFERENT INITIALIZATION MODES IN A SPECIFIC SEQUENCE

BACKGROUND OF THE INVENTION

1. Field of the Invention

The present invention generally relates to an information processing apparatus, method and program, and more particularly to an information processing apparatus, method and program, capable of processing information with a reduced time for starting up an operating system.

This application claims the priority of the Japanese Patent Application No. 2003-002119 filed on Jan. 8, 2003, the entirety of which is incorporated by reference herein.

2. Description of the Related Art

To start up kernels of an operating system (will be referred to simply as "OS" hereunder) having a definite device-driver framework such as the UNIX (registered trademark) OS or the like, the input-output (I/O) is initialized by referring to a table having initialization functions pre-registered therein in a dependency-relation sequence or the like and executing the initialization functions sequentially with a small number of threads.

Referring now to FIG. 1, there is schematically illustrated an example of the conventional I/O initialization. In the I/O initialization, generally indicated with a reference number 1, the threads are first locked in LOCK 2 and an Initialization 3 is done for use of the threads. Then, an I/O (input-output) Initialization 4 is done for sequentially calling and doing individual I/O Initializations 6. In the I/O Initialization 4, the individual I/O Initializations 6 are done in their registered sequence with reference to a predetermined Table 5 having an initialization method registered therein for each I/O.

Upon completion of the I/O Initialization 4, the threads are unlocked in UNLOCK 7, and then File System Mount 8 and Init File Execution (Exec/sbin/init) 9 are performed.

Alternatively, the I/O initializations may be performed after the OS startup proceeds until a plurality of threads is ready for use for parallel processing, for example.

FIG. 2 explains another example of the conventional I/O initialization. In this conventional I/O initialization, generally indicated with a reference number 11, the threads are locked in LOCK 12, an Initialization 13 is done for use of the threads, and then the threads are unlocked in UNLOCK 14.

When a plurality of threads is ready for use, an Init Function Call (Call init function of each driver parallel) 15 is performed for referring to a table standing on the inter-initialization dependency relation and generating a plurality of new kernel threads 15A for execution of a device driver as a parallel-processable init file function, and each of the kernel threads is executed.

Note that since these operations are synchronized with each other by a barrier 16, the operation will not go to any next step until all the kernel threads 15A have been executed.

Similarly to the above, when all the kernel threads are completely executed, an init Function Call (Call init function of each driver parallel) 17 is performed for generating a plurality of new kernel threads 17A and each of the kernel threads is executed, and these operations are synchronized with each other by a barrier 18. Also, when all the kernel threads are completely executed, an init Function Call (Call init function of each driver parallel) 19 is performed for generating a plurality of new kernel threads 19A and each of the kernel threads is executed, and these initializations are synchronized with each other by a barrier 20.

When all the I/O initializations for the device initialization are completed, various Initializations 21 that can be done after completion of the I/O initializations are done, and then a File System Mount 22 and Init File Execution (Exec/sbin/init) 9 are performed.

Alternatively, the I/O initializations may be done by normal parallelized operations when a user process has become usable after completion of the File System Mount and Init File Execution.

For starting up a plurality of computers, for example, the computers to be started up communicate with a computer having already been started up and are thus loaded with an OS. The OS is stored in place in a main storage, and then the control is passed to the OS. The OS having thus received the control prepare a necessary page table and stack in the main storage. Here, the startup is complete. The plurality of computers can thus be started up in parallel using a computer having already been started up, which leads to a reduction of the whole time for startup (also see the Japanese Published Unexampled Application No. 295289 of 1994 (pages 4 and 5, FIG. 6).

Also, in a system having a plurality of processors, as another example, a parent one of the processors is first started up and then it starts up the other ones, namely, child processors, in parallel. Thus, one of the processors, having completely been started up, can be used to start up the plurality of processors, which also leads to a reduction of the whole time for startup (also see the Japanese Published Unexampled Application No. 97465 of 1998 (pages 8–10, FIGS. 3 and 4).

In the aforementioned methods, the I/O initialization is done when the system has entered upon a specific phase as shown in a Table, indicated with a reference number 31, in FIG. 3 showing a hardware state at the OS startup, and a timing of the conventional I/O initialization.

Table 31 lists three initialization modes. The conventional I/O initialization has to be done in any one of three modes shown in Table 31. A "Sequential" mode is such that when no thread is usable (when a kernel B is being executed), the I/O initializations are done serially. A "Parallel" mode is such that when the thread is usable (a kernel C is being executed), the I/O initialization is divided into a plurality of steps whose number depends upon an inter-device dependency relation and the I/O initializations are done in parallel with each other in each of the steps. A "Lazy" mode is such that the I/O initializations are done after all the kernels are started up and a user process gets ready for execution.

In the "Sequential" mode for execution of the I/O initialization at the initial stage of the startup, devices are initialized serially. So, the wait time in the device initialization cannot effectively be utilized and thus the time for OS startup cannot be reduced.

Also, in the "Parallel" mode for execution of the I/O initialization at the middle stage of the startup, the I/O initialization is divided into a plurality of initializations (the number of initializations depends upon the inter-initialization dependency relation). Since the dependency relation limits the sequence in which the initializations are to be done in parallel, the initializations have to be synchronized with each other by a barrier, which will limit the granularity of initializations. Therefore, the wait time in the device initialization cannot fully be utilized and thus the time for OS startup cannot be reduced. Also, in this mode of initialization, no I/O initialization is done until a thread becomes usable. Namely, no device can be used before the thread is usable.

Further, in the "Lazy" mode, the I/O initialization is done after the user process becomes executable. Thus, the time for which the device is not usable is long. The "Lazy" mode is not suitable for use to start up a normal system which is controlled by one processor.

OBJECT AND SUMMARY OF THE INVENTION

It is therefore an object of the present invention to overcome the above-mentioned drawbacks of the related art by providing an information processing apparatus, method and program, capable of processing information with a reduced time for starting up an operating system.

The above object can be attained by providing an information processor including according to the present invention:

a first initialization means for performing, serially in a predetermined sequence and in a first state in which no threads are usable, a first group of initializations included in an I/O initialization and executable in the first state;

a second initialization means for performing, using threads, in a sequence depending upon the dependency relation of devices to be initialized and in a second state in which the threads are usable, a second group of initializations included in the I/O initialization, different from the first group of initializations and executable in the second state; and a third initialization means for performing, using the threads and in a third state in which a user process is usable, a third group of initializations included in the I/O initialization and different from the first and second groups of initializations.

In the above information processor according to the present invention, the first, second and third groups of initializations are set in a predetermined manner, and all operations included in the I/O initialization may be included in any one of the first, second and third groups of initializations.

The first group of initializations is settable in such a manner simpler than those in which the second and third groups of initializations are set that the wait time up to a time when a next initialization is executable is set longer.

The second initialization means may be designed to execute the second group of initializations, divided into a plurality of steps whose number depends upon the inter-device dependency relation, by executing the initializations in parallel with each other in each of the steps.

Also, the second initialization means may be designed to synchronize the steps with each other by a barrier, wait until all the initializations included in a step and which are to be done in parallel with each other are completed and then execute initializations included in a next step in parallel with each other.

The third initialization means may be designed to execute the initializations while being synchronous with a user program with the user of an synchronization object as necessary.

Also, the above object can be attained by providing an information processing method including according to the present invention:

a first initialization step for performing, serially in a predetermined sequence and in a first state in which no threads are usable, a first group of initializations included in an I/O initialization and executable in the first state;

a second initialization step for performing, using threads, in a sequence depending upon the dependency relation of devices to be initialized and in a second state in which the threads are usable, a second group of initializations included in the I/O initialization, different from the first group of initializations and executable in the second state; and a third initialization step for performing, using the threads and in a third state in which a user process is usable, a third group of initializations included in the I/O initialization and different from the first and second groups of initializations.

In the above information processing method according to the present invention, the first, second and third groups of initializations are set in a predetermined manner, and all operations included in the I/O initialization may be included in any one of the first, second and third groups of initializations.

The first group of initializations is settable in such a manner simpler than those in which the second and third groups of initializations are set that the wait time up to a time when a next initialization is executable is set longer.

The second initialization step may be designed to execute the second group of initializations, divided into a plurality of steps whose number depends upon the inter-device dependency relation, by executing the initializations in parallel with each other in each of the steps.

Also, the second initialization step may be designed to synchronize the steps with each other by a barrier, wait until all the initializations included in a step and which are to be done in parallel with each other are completed and then execute initializations included in a next step in parallel with each other.

The third initialization means may be designed to execute the initializations while being synchronous with a user program with the user of an synchronization object as necessary.

Also, the above object can be attained by providing a program allowing a computer to execute:

a first initialization step for performing, serially in a predetermined sequence and in a first state in which no threads are usable, a first group of initializations included in an I/O initialization and executable in the first state;

a second initialization step for performing, using threads, in a sequence depending upon the dependency relation of devices to be initialized and in a second state in which the threads are usable, a second group of initializations included in the I/O initialization, different from the first group of initializations and executable in the second state; and a third initialization step for performing, using the threads and in a third state in which a user process is usable, a third group of initializations included in the I/O initialization and different from the first and second groups of initializations.

In the above information processing method according to the present invention, the first, second and third groups of initializations are set in a predetermined manner, and all operations included in the I/O initialization may be included in any one of the first, second and third groups of initializations.

The first group of initializations is settable in such a manner simpler than those in which the second and third groups of initializations are set that the wait time up to a time when a next initialization is executable is set longer.

The second initialization step may be designed to execute the second group of initializations, divided into a plurality of steps whose number depends upon the inter-device dependency relation, by executing the initializations in parallel with each other in each of the steps.

Also, the second initialization step may be designed to synchronize the steps with each other by a barrier, wait until all the initializations included in a step and which are to be done in parallel with each other are completed and then execute initializations included in a next step in parallel with each other.

The third initialization means may be designed to execute the initializations while being synchronous with a user program with the user of an synchronization object as necessary.

In the aforementioned information processor, information processing method and information processing program according to the present invention, a first group of initializations included in an I/O initialization and executable in the first state is performed serially in a predetermined sequence and in a first state in which no threads are usable, a second group of initializations included in the I/O initialization, different from the first group of initializations and executable in the second state is performed using threads, in a sequence depending upon the dependency relation of devices to be initialized and in a second state in which the threads are usable, and a third group of initializations included in the I/O initialization and different from the first and second groups of initializations is performed using the threads and in a third state in which a user process is usable.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIG. 3 shows a hardware state at the OS startup, and a timing of the conventional I/O initialization;

FIG. 11 illustrates the construction of the I/O initialization program executed by CPU included in the HDD recorder shown in FIG. 4;

FIG. 12 schematically illustrates the construction of a registry to be read by a CPU in FIG. 4 at the OS startup;

FIG. 13 illustrates the construction of a driver program in the HDD recorder shown in FIG. 4;

FIG. 15 shows the relation between the system state at the OS startup in the HDD recorder shown in FIG. 4 and the timing of the I/O initialization;

FIG. 16 illustrates a table for management of the I/O initialization schedule;

DETAILED DESCRIPTION OF THE PREFERRED EMBODIMENTS

Figure 1:
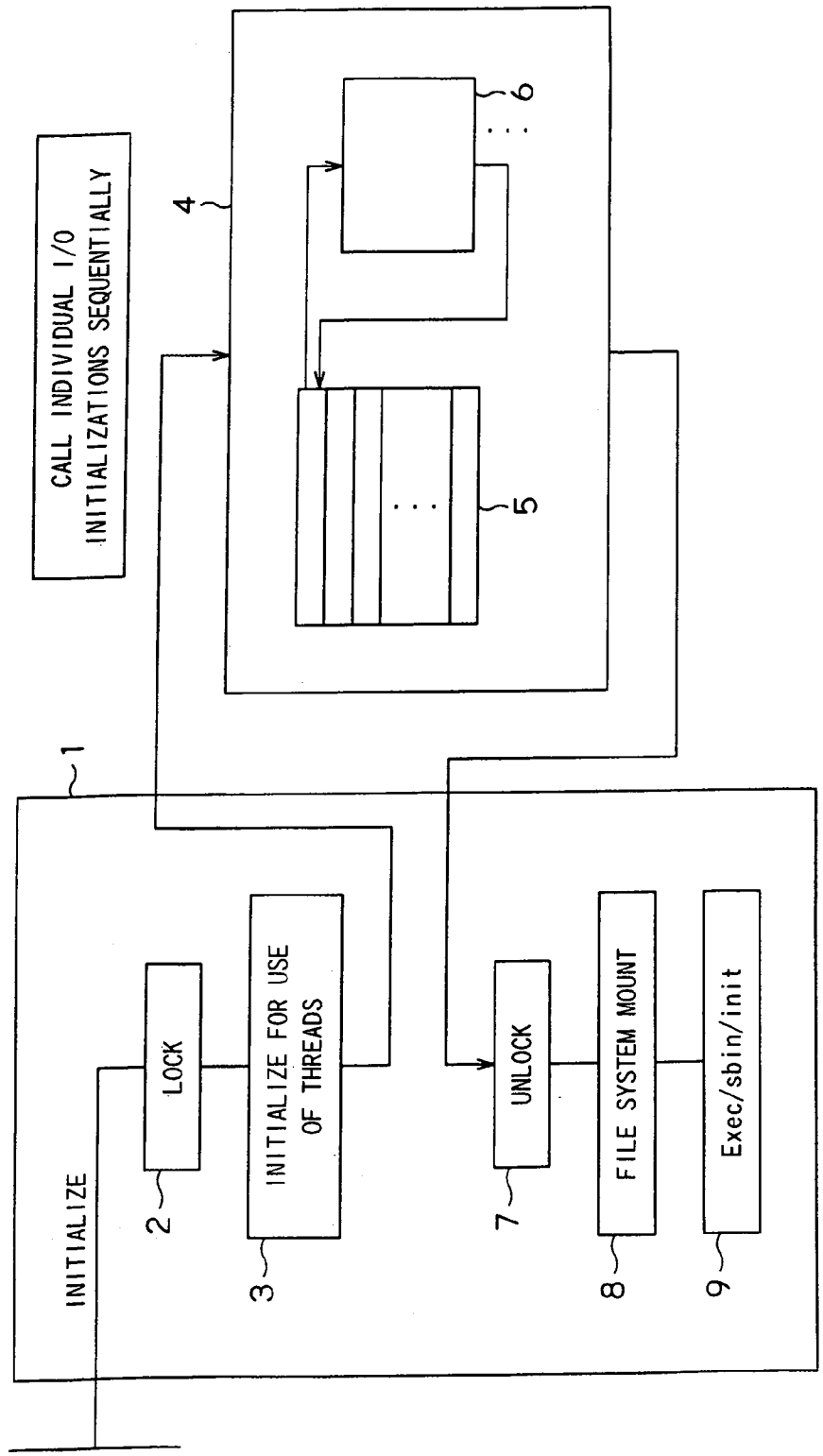
FIG. 1 explains an example of the conventional I/O initialization system.
Figure 2:
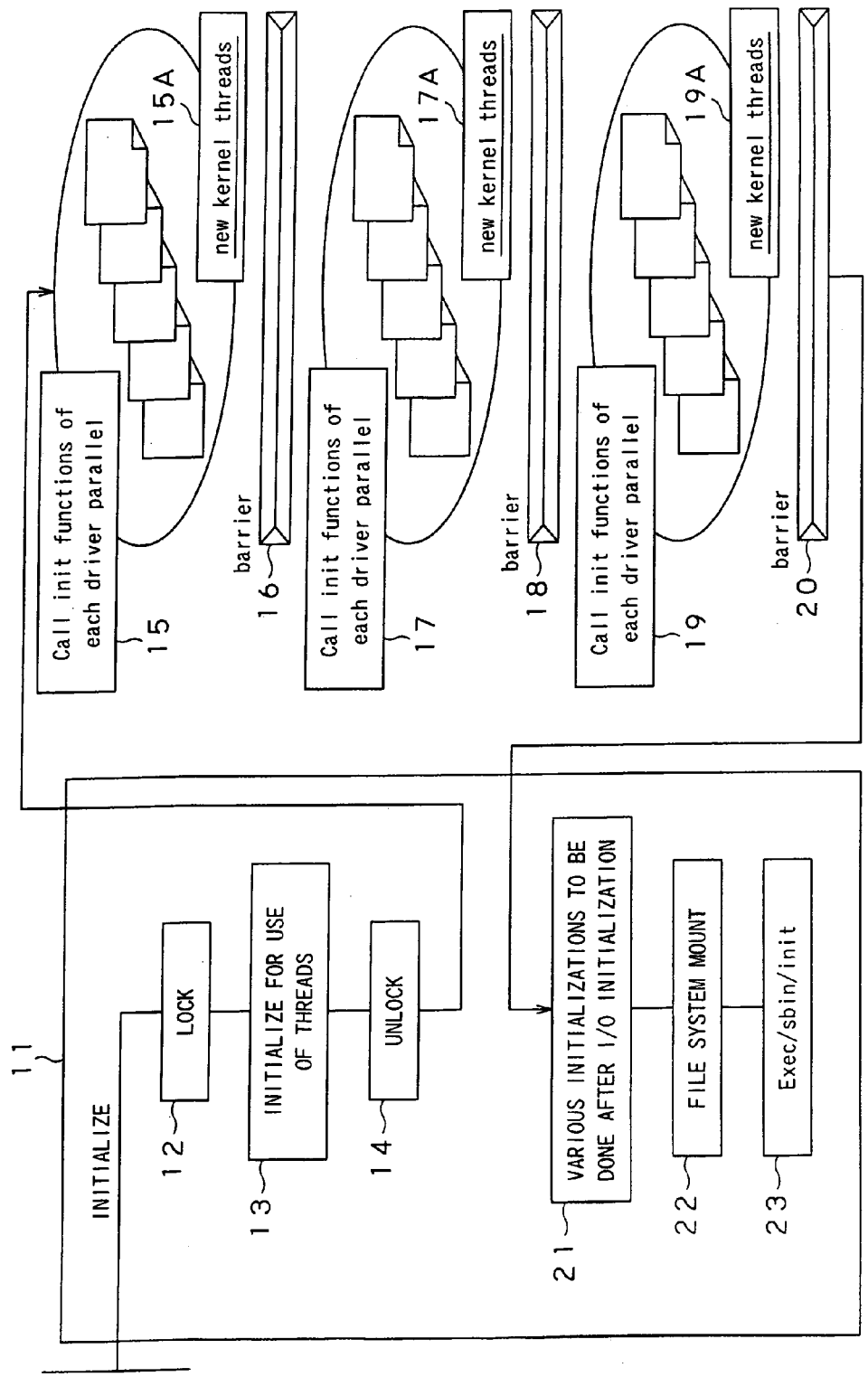
FIG. 2 explains another example of the conventional I/O initialization system.
Figure 4:
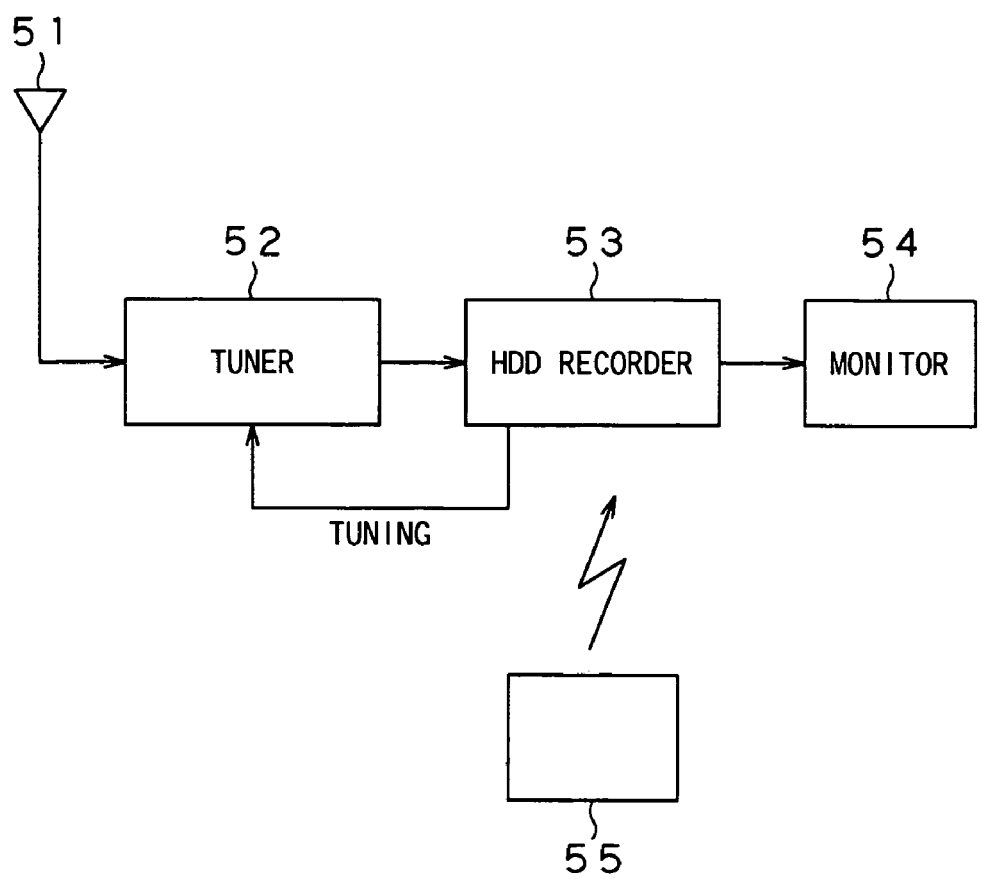
FIG. 4 is a block diagram illustrating the construction of a video signal reception system using a hard disk (HDD) recorder according to the present invention.

Referring now to FIG. 4, there is schematically illustrated in the form of a block diagram a video signal reception system using a hard disk (HDD) recorder according to the present invention.

As shown in FIG. 4, the video signal reception system includes a tuner 52 that receives, via an antenna 51, a radio wave sent via a satellite or a terrestrial antenna. It is controlled according to tuning control information supplied from a hard disk (HDD) recorder 53 from which channel the video signal reception system is to receive the radio wave.

The video signal reception system also includes a remote controller 55 that is operated by the user to provide a infrared signal corresponding to an operation by the user to the HDD recorder 53.

More specifically, when the user gives a command for reception of a radio wave from a predetermined broadcast station or on a predetermined channel by pressing the remote controller 55, the HDD recorder 53 provides, to the tuner 52, a tuning control signal for controlling the tuner 52 to receive radio waves on the channel. In response to the tuning control signal, the tuner 52 will receive a radio wave on that channel via the antenna 51, and provides the received signal to the HDD recorder 53. The HDD recorder 53 records the input signal from the tuner 52 to a hard disk incorporated therein.

Also, supplied with a command via the remote controller 55, the HDD recorder 53 reproduces video data and audio data recorded in a hard disk built therein, and provides the data to a monitor 54.

Figure 5:
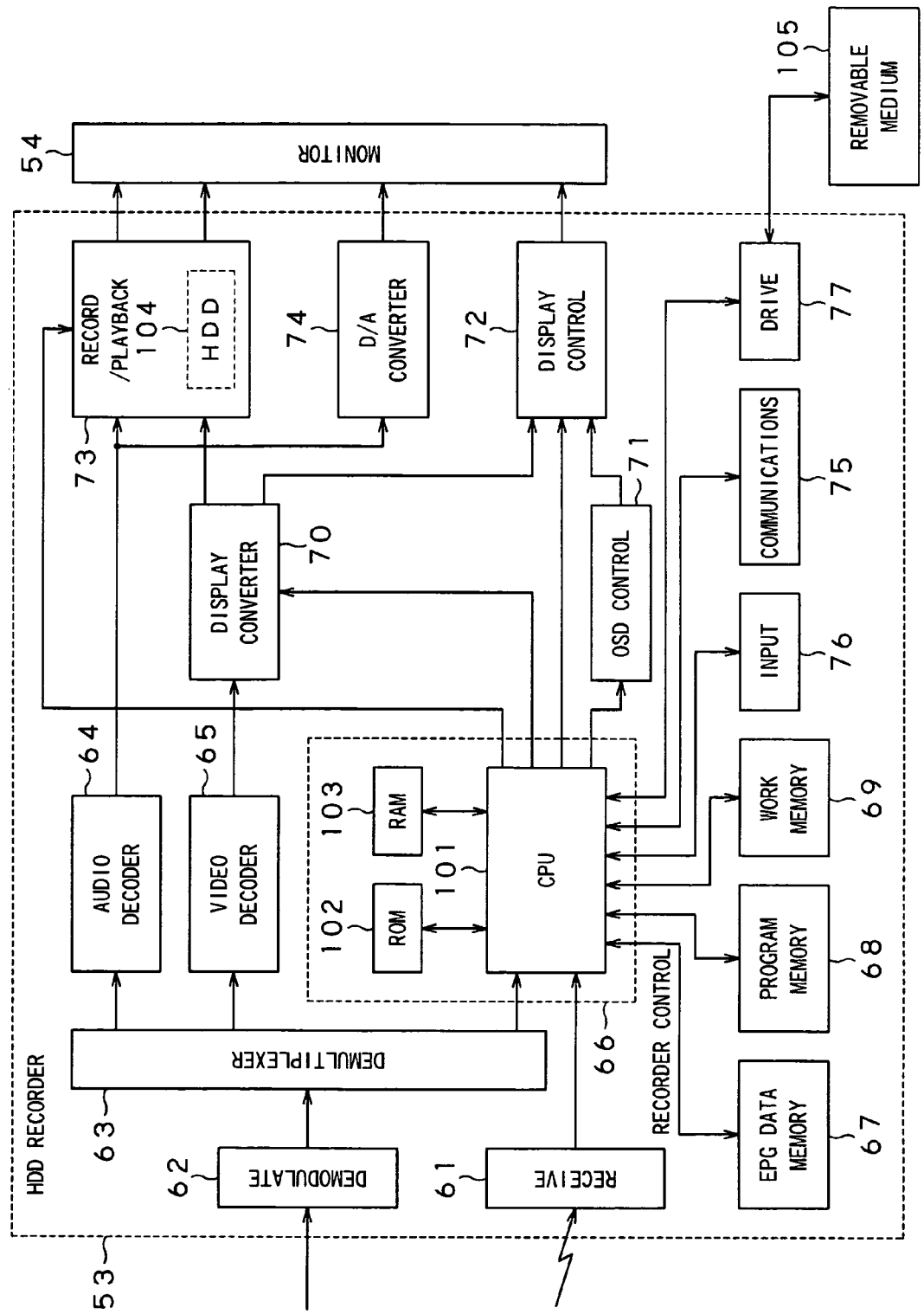
FIG. 5 is a block diagram illustrating the construction of the HDD recorder shown in FIG. 4.

The HDD recorder 53 is constructed as shown in FIG. 5, for example. In the HDD recorder 53, a reception block 61 receives an infrared signal from the remote controller 55, converts it into an electric signal and provides the signal to a recorder controller 66. As shown, the recorder controller 66 includes a CPU (central processing unit) 101, ROM (read-only memory) 102 and an RAM (random-access memory) 103. The CPU 101 loads, to the RAM 103, a program and data pre-stored in the ROM 102, program memory 68 or work memory 69. By performing a variety of operations, the CPU 101 controls each block of the HDD recorder 53.

The RAM 103 appropriately stores data necessary for performance of the variety of operations by the CPU 101. The recorder controller 66 controls a communications block 75 to supply a tuning control signal to the tuner 52.

In the HDD recorder 53, a demodulator 62 demodulates a signal supplied from the tuner 52 and provides the demodulated signal to a demultiplexer 63. The demultiplexer 63 demultiplexes data supplied from the demodulator 62 into audio data, video data and EPG (electronic program guide) data, and provides them to an audio decoder 64, video decoder 65 and CPU 101 in the recorder controller 66, respectively.

The audio decoder 64 decodes the supplied audio data by the MPEG technique for example and provides the decoded data to a recording/playback block 73. The video decoder 65 decodes the supplied video data by the MPEG technique for example and provides the decoded data to a display converter 70. The CPU 101 in the recorder controller 66 provides the input EPG data to an EPG data memory 67 where the data will be stored.

The display converter 70 encodes the video data supplied from the video decoder 65 into NTSC-based video data for example, and provides the encoded video data to the recording/playback block 73. Also, the display converter 70 converts the display size of the video data supplied from the video decoder 65 into a size corresponding to the screen size of the monitor 54, converts the size-changed video data into NTSC-based video data, then converts this video data into an analog signal and provides the analog signal to a display controller 72.

Under the control of the recorder controller 66, the display controller 72 superposes an OSD signal supplied from an OSD (on-screen display) controller 71 on the video signal supplied from the display converter 70, and supplies the result of superposition to the monitor 54 on which it will be displayed.

The monitor 54 is also supplied with an analog signal resulted from D/A conversion, by a D/A (digital-to-analog) converter 74, of the audio data output from the audio decoder 64. The monitor 54 provides the audio signal from a speaker built therein.

The recording/playback block 73 has built therein a hard disk (HDD) 104. It encodes the audio and video data by the MPEG technique for example, combines the data, makes channel coding of the data and then records the data to the HDD 104.

Also, the recording/playback block 73 reads the data from the HDD 104, and separates the data into audio data and video data. Then, it decodes the audio data by the MPEG technique, makes D/A conversion of the decoded data, supplies the analog data to the speaker of the monitor 54, from which it will be delivered as sounds, while decoding the video data by the MPEG technique, making D/A conversion of the decoded data and supplying the analog data to a display of the monitor 54, on which it will be displayed as an image.

The HDD recorder 53 has also an input block 76 composed of an input device operated by the user for supplying various instructions to the HDD recorder 53, such as a group of control buttons, touch panel, keyboard or a mouse. Similarly to the remote controller 55, the input block 76 is operable by the user for entry of instructions and supplies such an instruction to the CPU 101 in the recorder controller 66.

The HDD recorder 53 includes also a drive 77. The drive 77 is controlled by the CPU 101 to read a computer program or data from a removable recording medium 105 such as a magnetic disk, optical disk, magneto-optical disk or a semiconductor memory, and supplies the data to the CPU 101. The CPU 101 loads the computer program or data thus read to the RAM 103 or to the program memory 68 or work memory 69, as necessary.

Figure 6:
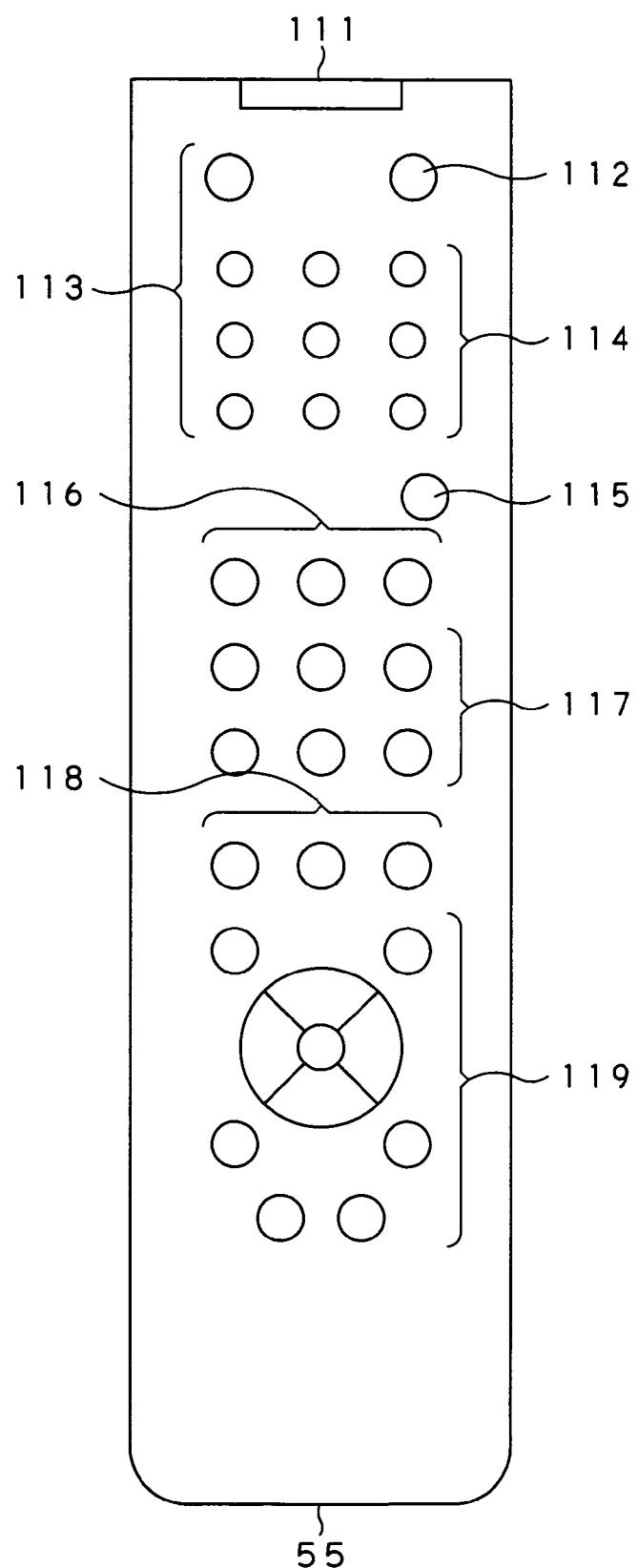
FIG. 6 is an external view illustrating the construction of a remote controller for use with the HDD recorder shown in FIG. 4.

FIG. 6 schematically illustrates the construction of the remote controller 55. As shown, the remote controller 55 includes a transmission block 111 which emits an infrared signal corresponding to a user-pressed one of the control buttons. The infrared signal emitted from the transmission block 111 is received by a reception block 61 of the HDD recorder 53.

The remote controller 55 has a power on-off button 112 that is operated by the user to connect or disconnect the power to or from the HDD recorder 53. When this power switch 112 is turned off, ones of the components of the HDD recorder 53, irrelevant to the signal reception, are taken out of operation for power saving but the main power supply is kept on. Therefore, even in this condition, the hard disk recorder 53 can receive control signals sent from the remote controller 55. When the user makes an instruction for power-on operation by operating the power button 112 on the remote controller 55 in this resting phase (the power is off according to an instruction from the remote controller 55), the CPU 101 of the recorder controller 66 controls each component to shift the HDD recorder 53 to an operable (power-on) phase. It should be noted that for a completely power-off state (main power supply is off), the user has to operate the power button (not shown) of the input block 76 in the HDD recorder 53.

Each of select buttons 113 shown in FIG. 6 is used to select an image or sound to be displayed on the screen of the monitor 54 or delivered from the speaker or to select a desired one of various information to be displayed on the monitor 54.

Each of monitor control buttons 114 also provided on the remote controller 55 is used to turn on or off the power to the monitor 54, adjust the sound volume delivered or select a desired channel. Also, there is provided a G guide button 115 that is used to display an EPG image or a program guide that shows a detailed content of each program.

Further, the remote controller 55 has a recording set button 116. This button 116 is used to make an instruction related to recording, such as a record start instruction, programming instruction or the like. Also, operation buttons 117 are provided on the remote controller 55. They are used to make instructions for start, stop, etc. in playing back a program recorded in the hard disk 104.

The remote controller 55 is further provided with set buttons 118. The set buttons 118 are used to make operations related to settings for displaying a menu screen intended for use to set the HDD recorder 53, for example. Also, there are provided simple control buttons 119 including a cross key etc. The simple control buttons 119 are used to operate a GUI (graphical user interface) anchor displayed on the monitor 54 or simplify the aforementioned operations.

When the user operates the input block 76 to switch on the power supply to the HDD recorder 53 whose main power supply is turned off, the CPU 101 in the recorder controller 66 will first execute the OS kernel dedicated to the HDD recorder 53, stored in the ROM 102 to start up the OS.

Figure 7:
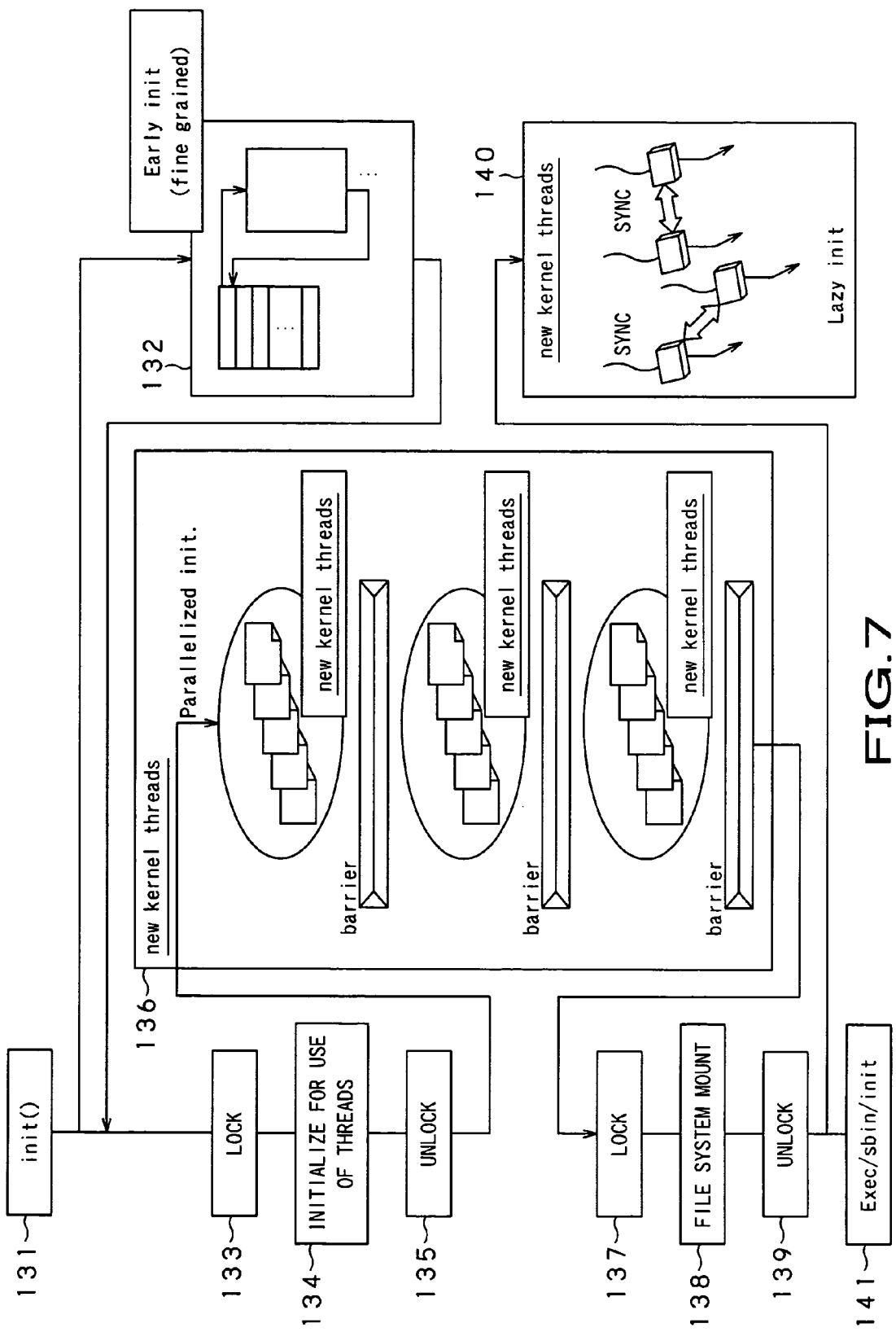
FIG. 7 explains an example of the I/O initialization system according to the present invention.

At this time, the CPU 101 make an I/O initialization as shown in FIG. 7 to control each component of the HDD recorder 53.

FIG. 7 schematically illustrates the I/O initialization system according to the present invention. First, the CPU 101 reads a table (init( )) 131 having an initialization procedure recorded therein, and starts an initialization according to the Table 131. With the kernel which is executed in a relatively early phase in which no thread can be used, the CPU 101 performs a first I/O Initialization (Early init) 132 serially. In the first I/O Initialization 132, initializations can be done without having to turn the power supply to the mechanical components and with a long wait time up to a next operation.

To initialize the hard disk 104 for example, the CPU 101 turns on the power supply to the hard disk 104 which will have a built-in motor started to rotate a disk. Thus, the CPU 101 has to wait until the motor runs stably. In the first I/O Initialization 132, the CPU 101 turns on the power supply to the hard disk 104 and then performs another initialization as will further be described later until the motor runs stably.

In the first I/O Initialization 132, initializations are done serially in a predetermined sequence since no threads can be used as mentioned above. The sequence may be stated in a kernel executed by the CPU 101 or may be stated in a predetermined table to which the kernel refers.

After having done the first I/O initialization 132, the CPU 101 locks a thread in LOCK 133 to initialize the thread, makes an Initialization 134 for use of the thread, and then unlocks the thread in UNLOCK 135, to thereby make the thread usable.

In this phase, the CPU 101 performs a second I/O Initialization 136. In the second I/O Initialization 136, the CPU 101 divides the initialization into a plurality of steps according to the dependency relation of a device to be initialized. In each of the steps, the CPU 101 parallelizes and performs the initialization steps using an available thread. At this time, the CPU 101 synchronizes the initialization steps with each other by a barrier, and has the sequence of initializations correspond to the inter-device dependency relation.

With completion of all the initialization steps as above, the CPU 101 exits the second I/O Initialization, and performs LOCK 137 for execution of a user process, and then a File System Mount 138 and UNLOCK 139.

When the user process becomes executable, the CPU 101 performs a third I/O Initialization (Lazy init) 140. Using a thread, the CPU 101 performs the remaining initializations in parallel with each other commensurately to the user process. In the third I/O Initialization 140, a device is initialized which is compatible with a long time from the start of OS startup up to execution of the OS startup and a long period for which the device itself is not usable. It should be noted that in the third I/O Initialization 140, parallelized initializations are performed synchronously with each other using a normal sync object as necessary.

Once the aforementioned third I/O Initialization 140 starts being executed, the CPU 101 will perform an Init File Execution (Exec/sbin/init) 141 to make various settings, and complete the startup.

The I/O initializations performed by the CPU 101 in the aforementioned series of initializations will be explained with reference to the flow charts in FIGS. 8 to 10, and also with reference to FIGS. 11 to 13 as necessary.

Figure 8:
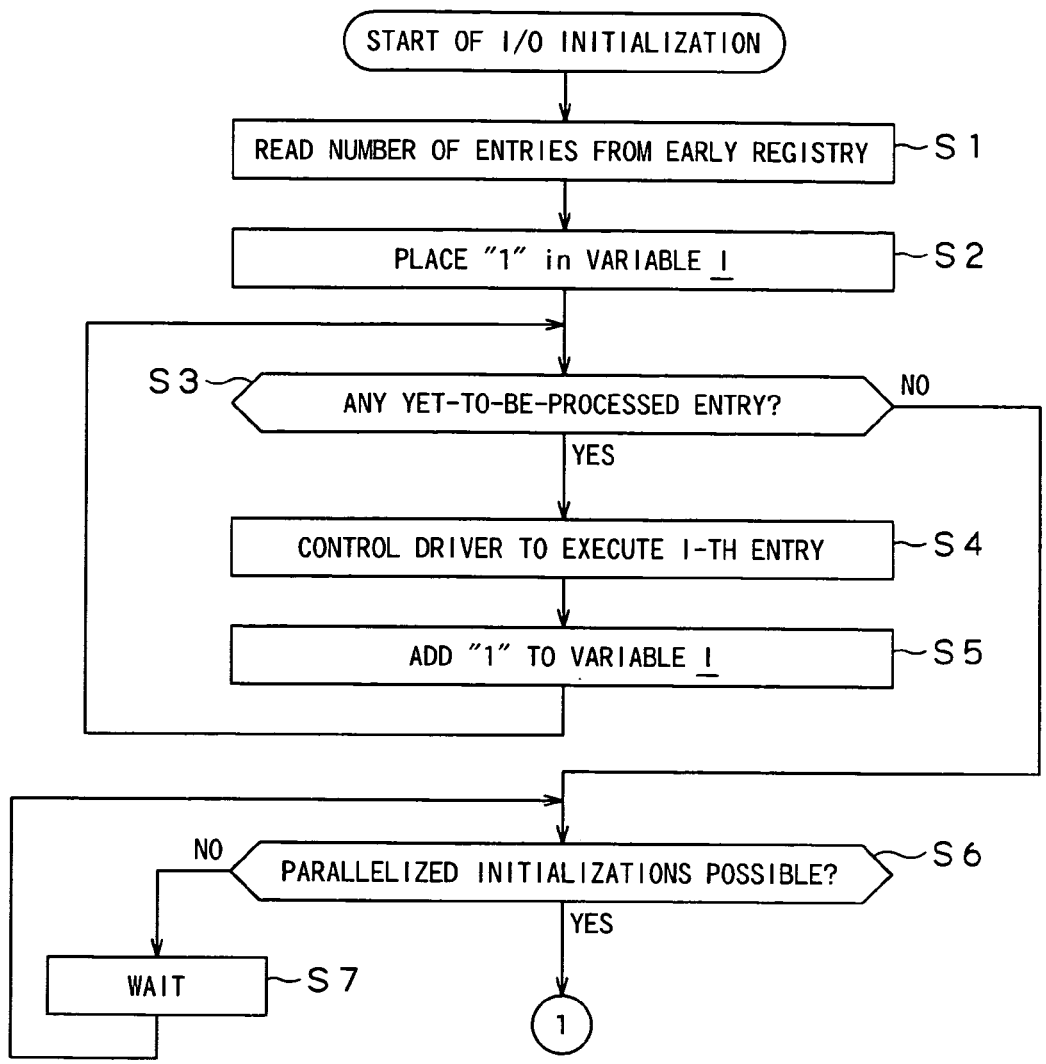
FIG. 8 shows a flow of operations made during the I/O initialization of the HDD recorder shown in FIG. 4.

First in step S1 in FIG. 8, the CPU 101 reads the number of entries from an Early registry.

FIG. 11 illustrates the construction of an I/O initialization program executed by the CPU 101. By executing a Statement 151 "early_init_entry_number=N" on the first line from above in an I/O initialization program 150 in FIG. 11, the CPU 101 reads the number of entries N registered in the Early registry shown in FIG. 12 in step S1 in FIG. 8.

FIG. 12 schematically illustrates the construction of a registry to be read by the CPU 101 at the OS startup. As shown in FIG. 12, one entry is registered in the Early registry of a registry 161. Therefore, the entries count one (N=1) in this case.

In step S2 in FIG. 8, the CPU 101 places a value "1" in a variable i Then in step S3, the CPU 101 judges whether there remains any yet-to-be-processed entry in the Early registry. When the result of judgment is affirmative (there remains a yet-to-be-processed entry), the CPU 101 goes to step S4 where it will controls the driver to execute the i-th entry. After completion of the execution of the i-th entry, the CPU 101 goes to step S5 where it will add a value "1" to the variable i, and then return to step S3 where it will repeat subsequent operations.

In step S3, the CPU 101 will execute all the entries registered in the Early registry. When the CPU 101 determines that there remains no yet-to-be-processed entry, the CPU 101 goes to step S6.

More particularly, the CPU 101 executes an operation in a Statement 152 on lines 2 to 4 from above in FIG. 11 to read and execute entries registered in the Early registry in their registered order. As in FIG. 12, the Early registry has "hdd_early_init" as an initialization to be performed. The CPU 101 controls the driver of the hard disk 104 according to the entry to execute the "hdd_early_init".

FIG. 13 illustrates the construction of a driver program in the hard disk 104. As shown in FIG. 13, the driver, indicated with a reference number 170, includes the Statement 171 concerning an operation to be done in the first I/O initialization. As in FIG. 13, the CPU 101 sets the value of "power_register" to "1" according to the Statement 171 to turn on the power supply to the hard disk 104.

As above, the CPU 101 repeats steps S3 to S5 in FIG. 8 to process all the entries in the Early registry.

In step S6, the CPU 101 judges whether the initializations can be parallelized. When it determines that no thread is yet usable and thus no parallel initializations are possible, it goes to step S7 where it will wait, and then goes back to step S6 where it will repeat the subsequent operations. That is, after the CPU 101 has completed operations registered in the Early registry, it will repeat steps S6 and S7 and wait until the threads become usable.

Figure 9:
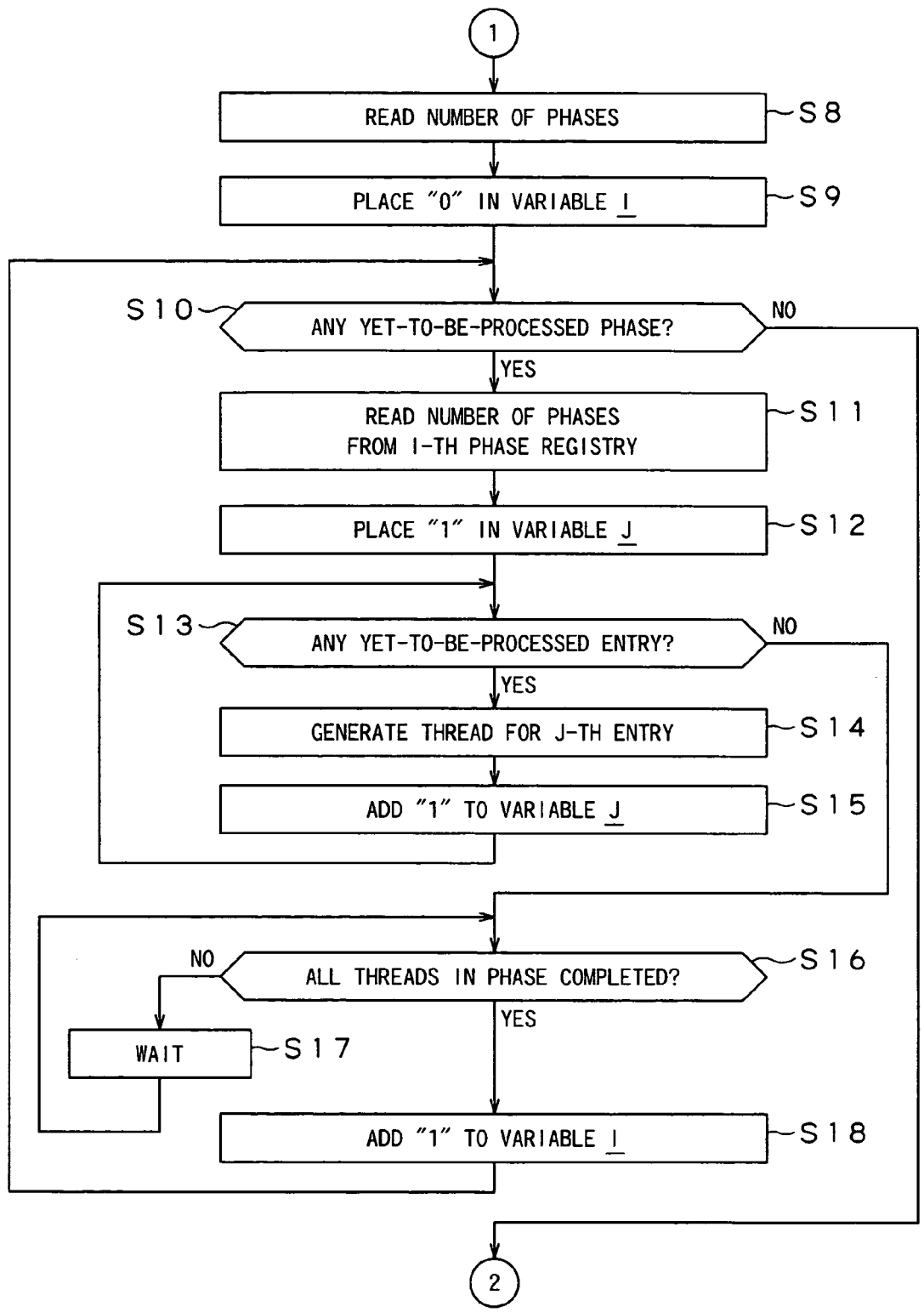
FIG. 9 is a flow chart continued from FIG. 8, showing the operations made during the I/O initialization of the HDD recorder shown in FIG. 4.

When the threads become usable by initialization of the threads, schedulers and parallelizations by other operations as shown in FIG. 11 and when it is determined in step S6 that the initializations can be done in parallel with each other, the CPU 101 goes to step S8 in FIG. 9.

In step S8 in FIG. 9, the CPU 101 reads the number of phases as steps of initializations to be done in the second I/O initialization.

The CPU 101 executes "phase_number=M" in a statement 153 shown nearly in the middle in FIG. 11 to count phase registries and read the number of phases. Since the registry shown in FIG. 12 has registries "phase 0" to "phase 3", the phases count 4 (M=4) in number.

Having read the number of phases, the CPU 101 places a value "0" in the variable i in step S9 in FIG. 9, and goes to step S10 where it will start processing the entries registered in each phase registry.

In step S10, the CPU 101 judges whether there exists any yet-to-be-processed phase. When the result of judgment is affirmative (there exists a yet-to-be-processed phase), the CPU 101 goes to step S11 wherein it will read the number of entries from the i-th phase registry.

The CPU 101 executes "phase[i]_number=P" in a statement 154 on a line 10 from below in FIG. 11 to count and read entries P in the i-th phase registry. When the CPU 101 reads the number of entries in a "phase 0" registry shown in FIG. 12, the number of entries P=2; when it reads the number of entries in a "phase 1" registry, the number of entries P=2; when it reads the number of entries in a "phase 2" registry, the number of entries P=4; and when it reads the number of entries in a "phase 3" registry, the number of entries P=1.

Having read the number of entries, the CPU 101 places a value "1" in the variable j in step S12 in FIG. 9, and goes to step S13 where it will process each entry.

Namely, the CPU 101 judges in step S13 whether there exists any yet-to-be-processed entry. When the result of judgment is affirmative, the CPU 101 goes to step S14 where it will generate a thread for the j-th entry, then goes to step S15 where it will add "1" to the value of the variable j, and returns to step S13 where it will repeat the subsequent operations.

If the CPU 101 generates threads for all entries registered in the i-th phase registry in step S13 and determines that there exists no yet-to-be-processed entry, it goes to step S16.

More particularly, the CPU 101 executes, in the i-th phase of the second I/O initialization, an operation in a statement 155 on lines 9 to 7 from below in FIG. 11 to read entries registered in a "phase [i]" registry in their registered order to generate threads for the entries and execute the threads in parallel with each other. As in FIG. 12, the "phase [i]" registry has registered therein initializations "SCSI_CHIP_init" and "USB_CHIP_init" to be done. The CPU 101 drives an SCSI (small computer system interface) and USB (universal serial bus) controllers according to the entries.

As above, the CPU 101 repeats steps S13 to S15 in FIG. 9 to process all the entries in the "phase [i]" registry.

In step S16, the CPU 101 synchronizes the initializations with each other by a barrier, and judges whether all the threads in the i-th phase have completely been executed. When the CPU 101 determines that all the threads have not yet completely been executed, it goes to step S17 where it will wait, and then returns to step S16 where it will repeat the subsequent operations. That is, after generating the thread for each of the operations registered in the "phase [i]" registry, the CPU 101 will wait while repeating the operations in steps S16 and S17 until the threads have completely been executed.

If the CPU 101 determines in step S16 that all the threads in the phase have completely been executed, it goes to step S18 where it will add "1" to the value of the variable i, and then returns to step S10 where it will repeat the subsequent operations.

Figure 10:
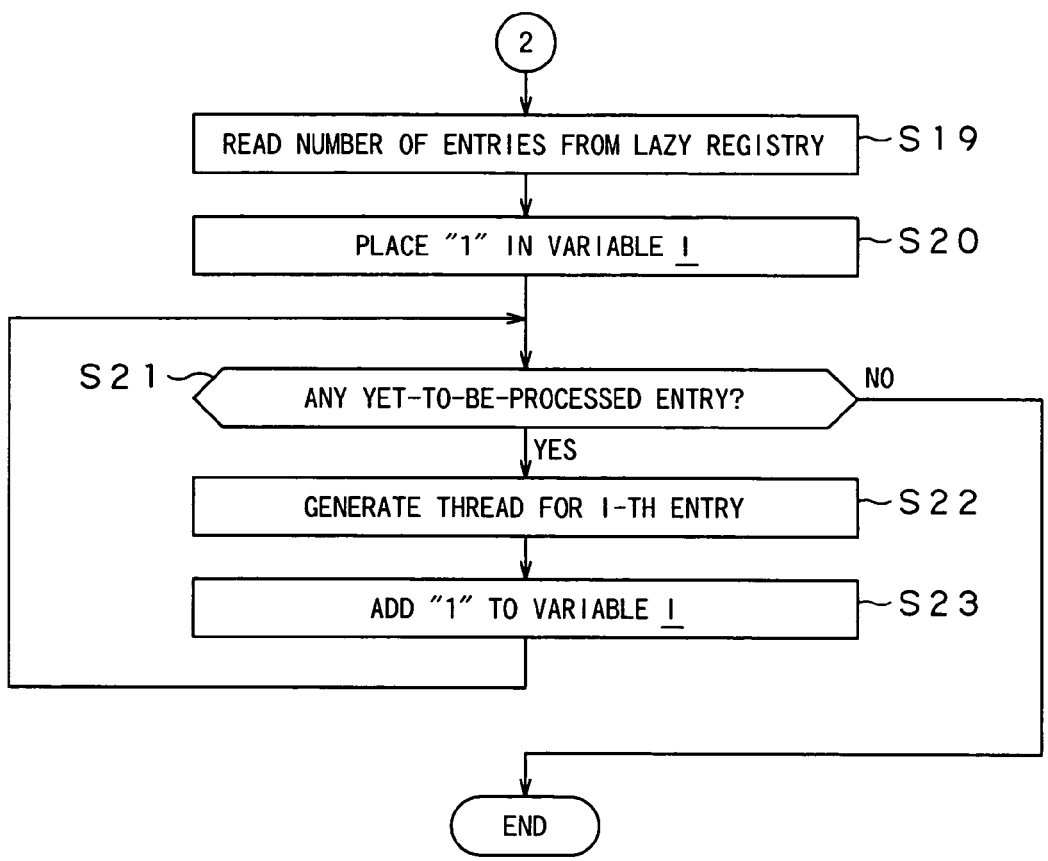
FIG. 10 is a flow chart continued from FIG. 9, showing the operations made during the I/O initialization of the HDD recorder shown in FIG. 4.

If the CPU 101 executes all the entries for all the phase registries in step S10 and determines that there is no yet-to-be-processed phase, it goes to step S19 in FIG. 10.

More specifically, the CPU 101 executes an operation on lines 11 to 5 from below in FIG. 11 as the second I/O initialization to read the entries registered in each phase registry in the order of phase numbers, sets a plurality of threads and executes the operations while synchronizing the threads with each other by a barrier.

In step S19 in FIG. 10, the CPU 101 reads the number of entries from the Lazy registry similarly to the reading from the Early and phase registries, respectively.

In step S19 in FIG. 10, the CPU 101 executes "Lazy_number=Q" in a statement 157 on line 4 from below in FIG. 11 to read the number of entries Q registered in the Lazy registry shown in FIG. 12. As shown in FIG. 12, the Lazy registry has one entry registered therein. Therefore, the number of entries Q=1.

In step S20 in FIG. 10, the CPU 101 places a value "1" in the variable j. Then in step S21, the CPU 101 judges whether there is any yet-to-be-processed entry in the entries registered in the Lazy registry. When the result of judgment is affirmative, the CPU 101 goes to step S22 where it will limit the driver and generate a thread for the i-th entry. Then the CPU 101 goes to step S23 where it will add a value "1" to the value of the variable j, and returns to step S21 where it will repeat the subsequent operations.

If the CPU 101 executes all the entries for the Lazy registry in step S21 and determines that there exists no yet-to-be-processed entry, it will exit the I/O initialization.

More specifically, the CPU 101 executes an operation on lines 3 to 1 from below in FIG. 11 as the third I/O initialization to read entries registered in the Lazy registry, sets a plurality of threads and execute the initializations with the threads. It should be noted that each of the threads can normally be synchronized with other threads as necessary.

As in FIG. 12, the Lazy registry has registered therein "hdd_lazy_init" as an initialization to be done. The CPU 101 controls the driver of the hard disk 104 according to the entry and executes "hdd_lazy_init" of the driver 170 in FIG. 13.

As shown in FIG. 13, the driver 170 includes a Statement 171 related to operations to be done in the third I/O initialization. As in FIG. 13, if the motor has not attained any stable run and is not ready for a next operation (if (!ready)), the CPU 101 waits (sleep (sync)) according to a statement 172. In case the motor is ready for a next operation, the CPU 101 will make an operation subsequently stated such as a Prove Initialization (issue prove cmd) or the like.

Since the I/O initializations are done as above, the initialization can be done in various phases at the OS startup and other initializations can be done during waiting. So, the OS can be started up in a reduced time.

Figure 14:
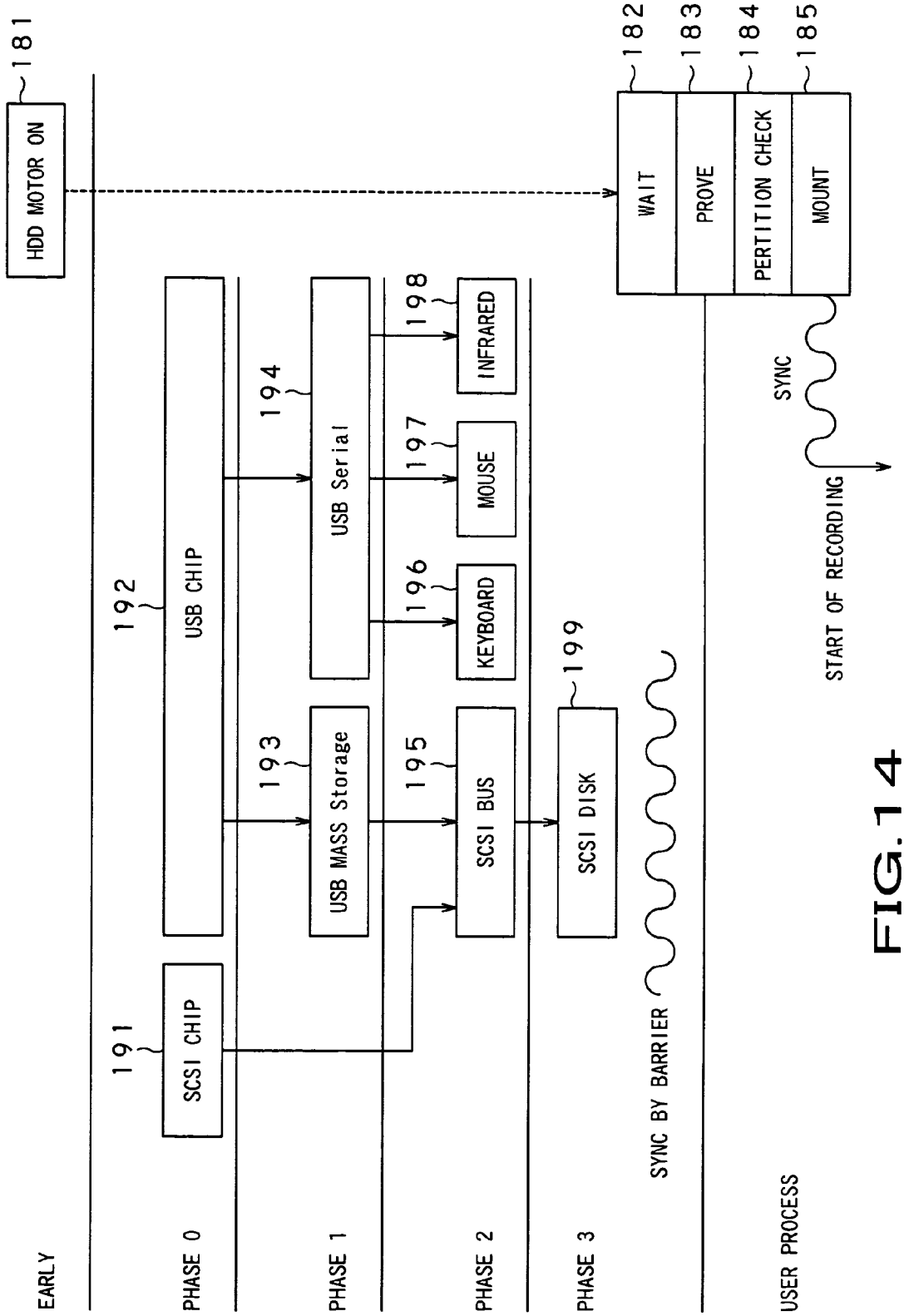
FIG. 14 schematically illustrates the procedure for the I/O initialization executed in the HDD recorder shown in FIG. 4.

For example, the CPU 101 makes a HDD motor ON operation 181 in the Early mode in which no thread can be used as shown in FIG. 14. Then, the CPU 101 performs initializations for USB and SCSI in the "phase 0" to "phase 3" modes until the motor runs stable.

That is, in the phase 0, the CPU 101 sets and executes threads for an SCSI_CHIP 191 for initialization of the SCSI controller and USB_CHIP 192 for initialization of the USB controller. Upon completion of the thread execution, the CPU 101 shifts to the phase 1 where it will set and execute threads for USB Mass Storage 193 for initialization of the driver to use an USB-connectable device as a removable medium and USB Serial 194 for initialization of the driver to control the USB-connectable device. Upon completion of the thread execution, the CPU 101 shifts to the phase 2.

In the phase 2, the CPU 101 sets and executes threads for SCSI BUS 195 for initialization of an SCSI bus controller, Keyboard 196 for initialization of the keyboard of the input block 76, Mouse 197 for initialization of the mouse in the input block 76, and Infrared 198 for initialization to make infrared communications in the reception block 61. Upon completion of the thread execution, the CPU 101 shifts to the phase 3 where it will set and execute a thread for SCSI DISK 199 for initialization of a controller to control a drive 290. Upon completion of the thread execution, the CPU 101 shifts to the Lazy mode.

When the motor attains a stable run, the CPU 101 will make a procedure for initialization of the hard disk 104 in the Lazy mode (user process).

For example, the CPU 101 will make Wait 182 in the Lazy mode until it is ready for a next operation. When the CPU 101 gets ready for the next operation, it executes a Prove Initialization 183, Partition Check 184 and File System Mount 185.

Note that since the CPU 101 can use the user process in the Lazy mode, it may be adapted to start recording synchronously with the file system mount 185 as shown in FIG. 14, for example.

As above, the CPU 101 can make I/O initialization in any phase of the OS startup in which the system state varies as in "New" initialization in Table 211 shown in FIG. 15.

Therefore, a variety of I/O initializations can be done in an optimum phase to start up the OS in a reduced time.

Note that although the CPU 101 is adapted to perform the I/O initialization according to a schedule based in the registry 161 constructed as shown in FIG. 12 as having been described above, the present invention is not limited to this technique but the CPU 101 may be adapted to perform the I/O initialization with reference to Table 231 shown in FIG. 16, prepared separately from the kernel of the OS to be started up, for example. Namely, the 110 initialization by the CPU 101 is substantially the same as having been described above with reference to FIGS. 8 to 10 except for the reference to Table 231, not to the registry 161, in this case. Therefore, the latter technique will not be described herein.

In the foregoing, the I/O initialization of the HDD recorder according to the present invention has been described. However, the present invention is not limited to such an I/O initialization but may be applied to an I/O initialization of an OS incorporated in a home-use electric or electronic appliance.

Also, the aforementioned series of operations can be performed by either a hardware or software. The I/O initialization according to the present invention is applicable to a personal computer 251 as shown in FIG. 17.

Figure 17:
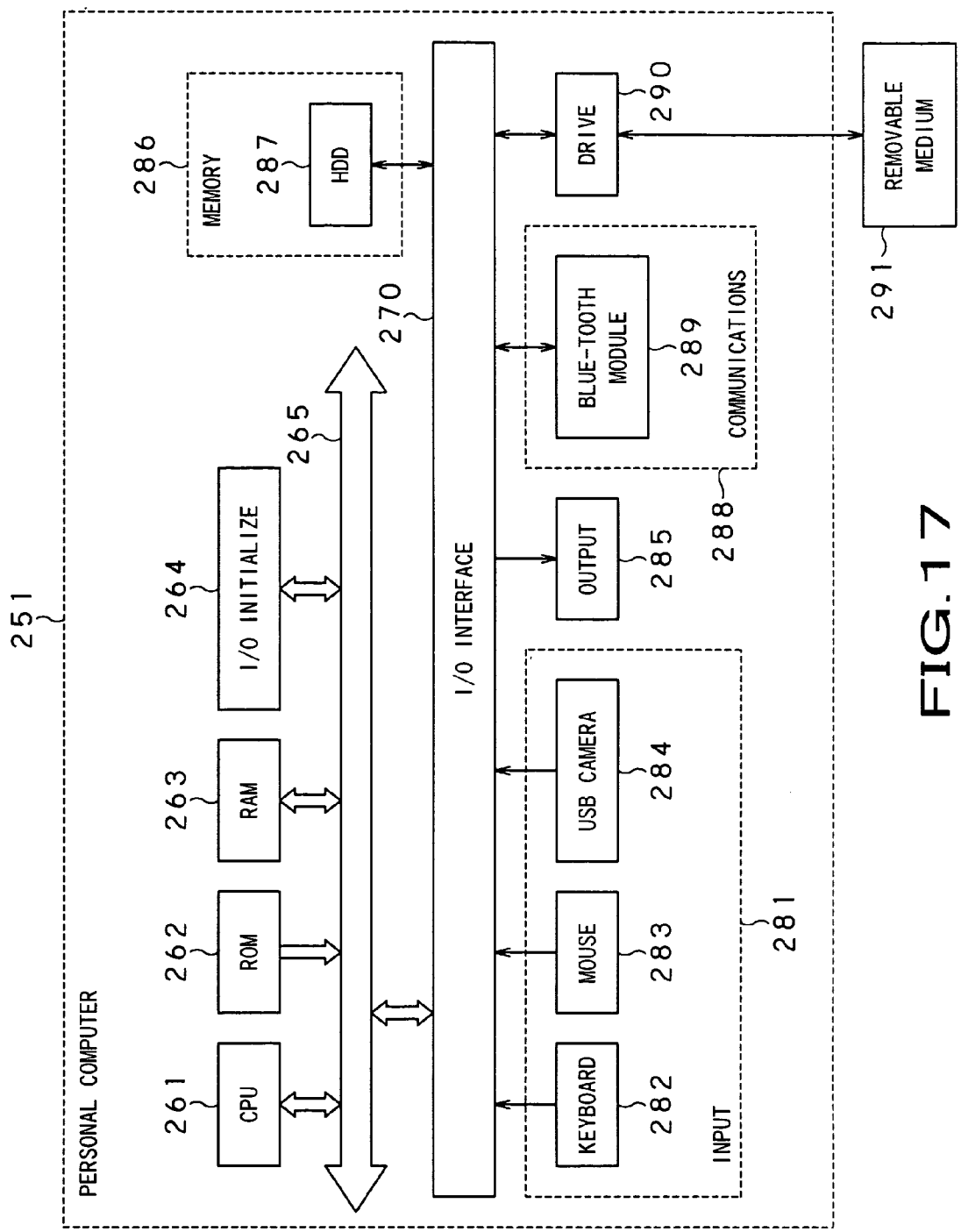
FIG. 17 illustrates the construction of a personal computer according to the present invention.

As shown in FIG. 17, a CPU 261 in the personal computer 251 performs various operations according to a program stored in a ROM 262 or a program loaded from a hard disk (HDD) 287 in a storage block 286 to a RAM 263. The RAM 263 has also stored appropriately therein necessary data for execution by the CPU 261 to perform such operations.

The personal computer 251 includes an I/O initialization block 264 which is controlled by the CPU 26 to make an I/O initialization similar to the aforementioned one at the startup of the personal computer 251 according to the program stored in the ROM 262. With this initialization, the OS can be started up in the personal computer 251 and thus the CPU 261 can control various components of the personal computer 251.

As shown in FIG. 17, the CPU 261, ROM 262, RAM 263 and I/O initialization block 264 are connected to each other by a bus 265 to which an I/O interface 270 is also connected.

The I/O interface 270 has connected thereto an input block 281 including a keyboard 282, mouse 283, USB camera 284, etc., an output block 285 including a CRT (cathode ray tube), LCD (liquid crystal display), speaker, etc., the storage block 286 including the HDD 287, etc. and a communications block 288 including a blue-tooth module 289 or modem, terminal adapter, etc.

The I/O interface 270 has also a drive 290 connected thereto as necessary. A removable medium 291 such as a magnetic disk, optical disk, magneto-optical disc or semiconductor memory is loaded in the drive 290 to read a computer program from the medium for installation to the HDD 287 in the storage block 286 as necessary.

In the personal computer 251 constructed as above, the I/O initialization block 264 is controlled by the CPU 261 to perform an I/O initialization similar to that shown in FIGS. 8 to 10, done by the CPU 101 in the HDD recorder 53 shown in FIG. 5.

Figure 18:
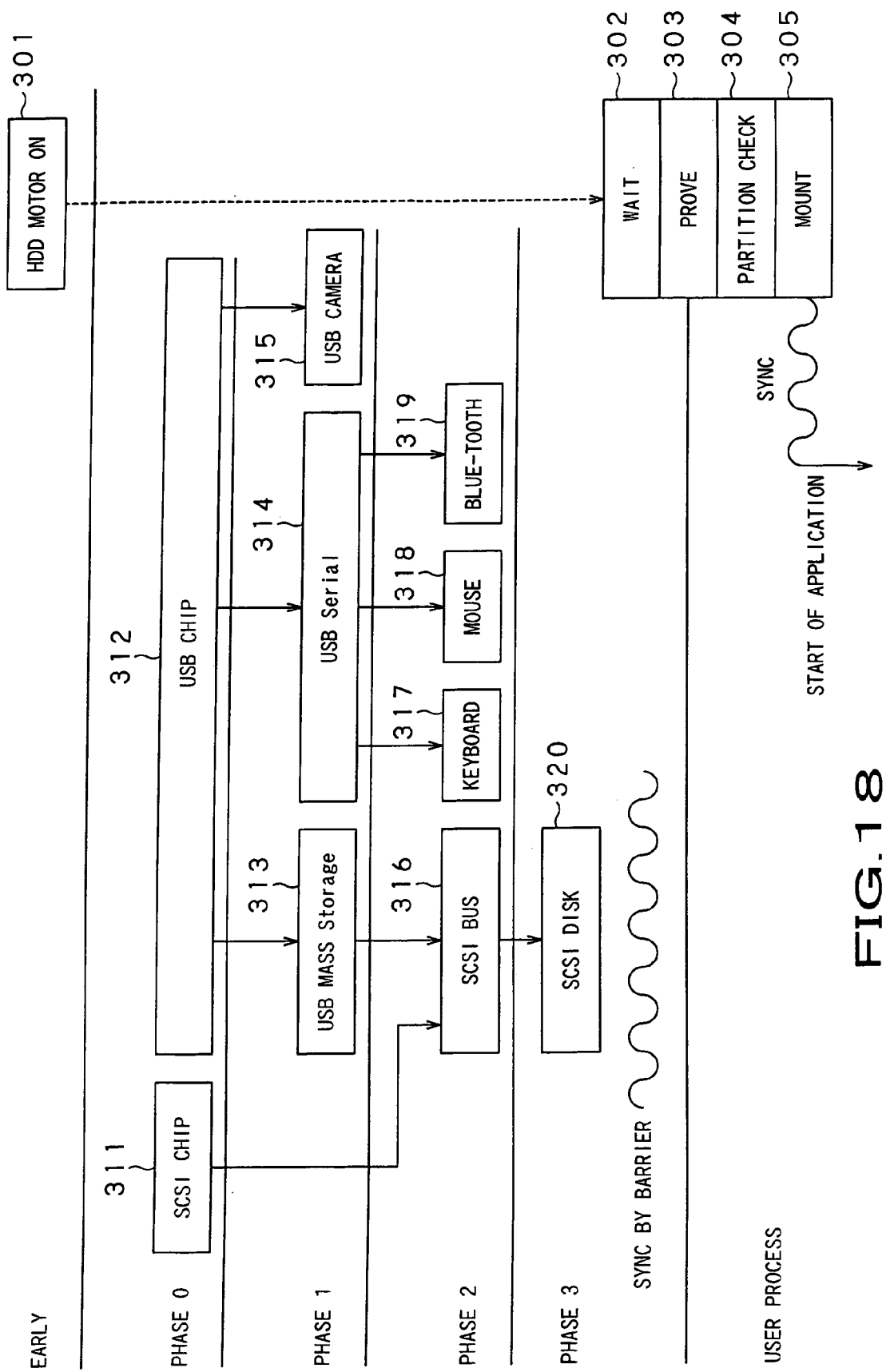
FIG. 18 shows the relation between the system state at the OS startup in the personal computer shown in FIG. 17 and the timing of the I/O initialization

That is, the I/O initialization block 264 makes an HDD motor ON operation 301 of the hard disk 287 in the storage block 286 in a phase in which no threads can be used (Early) as shown in FIG. 18.

When the threads become usable before the motor runs stable, the I/O initialization block 264 sets and executes threads for an SCSI_CHIP 311 for initialization of an SCSI controller and USB_CHIP 312 for initialization of a USB controller in the "phase 0" according to a schedule standing on information in the registry or the like.

After completion of the above operations, the I/O initialization block 264 shifts to the "phase 1" in which it will set and execute threads for USB Mass Storage 313 for initialization of the drive for use of a USB-connectable device as a removable medium, USB Serial 314 for initialization of the drive for controlling the USB-connectable device and USB Camera 315 for initialization of a USB camera 284 in the input block 281, respectively. Upon completion of these operations, the I/O initialization block 264 shifts to the "phase 2".

In the phase 2, the I/O initialization block 264 sets and executes threads for SCSI BUS 316 for initialization of a controller of an SCSI bus, Keyboard 317 for initialization of the keyboard 282 in the input block 281, Mouse 318 for initialization of the mouse 283 in the input block 281 and Blue-tooth 319 for initialization of the blue-tooth module 289 in the communications block 288. After completion of these operations, the I/O initialization block 264 shifts to the "phase 3" in which it will set and execute a thread for SCSI DISK 320 initialization of the drive 290. Upon completion of this operation, the I/O initialization block 264 shifts to the Lazy mode.

When the motor attains a stable run, the I/O initialization block 264 makes an initialization procedure for the hard disk 287 in the Lazy mode (user process).

For example, the I/O initialization block 264 makes, in the Lazy mode, Wait 302 until it become ready for a next operation. When the I/O initialization block 264 is ready for the next operation, it performs Prove Initialization 303, Partition Check 304, File System Mount 305, etc.

Since the OS is started up by the I/O initialization block 264, the OS of the personal computer 251 can be started up in a reduced time.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

For example, since the I/O initialization block 264 can use the user process in the Lazy mode, it may be adapted to start an application by the user process synchronously with the File System Mount 305 as shown in FIG. 18, for example.

Also, as having been described above with reference to FIG. 16, the I/O initialization may be arranged in the form of a schedule table to which the I/O initialization block 264 can refer.

The I/O initialization block 264 has been described as a block separate from the CPU 261 with reference to FIG. 17. However, the present invention is not limited to this construction of the personal computer 251 but a part or all of the functions of the I/O initialization block 264 may be included in the CPU 261.

For performance of a series of operations by a software, a program forming the software is installed from a network or a recording medium into a computer incorporated in a dedicated hardware or a general-purpose computer capable of having installed therein a variety of programs and performing various functions.

As shown in FIG. 5 or 17, the above recording medium may be a removable medium 105 or 291 such as a magnetic disk (including a flexible disk), optical disk (including a CD-ROM=Compact disk—read-only memory and DVD=Digital versatile disk), magneto-optical disk (including an MD=Mini-disk) or semiconductor memory, each having recorded therein a program to be distributed to the user separately from the apparatus itself. Alternatively, it may be a ROM 102 or 262 or hard disk 104 or 287, each pre-incorporated in the apparatus itself and having recorded therein a program to be distributed to the user.

The steps for stating a program recorded in a recording medium include operations effected time-serially in a stated sequence as well as those effected not always time-serially but in parallel or individually.

Also, the "system" referred to herein means an entire apparatus composed of a plurality of units.

As having been described in the foregoing, the present invention can allow an operation system (OS) to be I/O-initialized. Especially, the present invention can allow the OS to be started up in a reduced time.

What is claimed is:

1. An information processor with execution of I/O initialization of an operating system, the processor comprising:
    a first initialization means for performing, serially in a predetermined sequence and in a first state in which no threads are usable, a first group of initializations included in an I/O initialization and executable in the first state;
    a second initialization means for performing, after the first initialization means performs the first group of initializations, using threads, in a sequence depending upon a dependency relation of devices to be initialized and in a second state in which the threads are usable, a second group of initializations included in the I/O initialization, different from the first group of initializations and executable in the second state; and
    a third initialization means for performing, after the second initialization means performs the second group of initializations, using the threads and in a third state in which a user process is usable, a third group of initializations included in the I/O initialization and different from the first and second groups of initializations.

2. The apparatus as set forth in claim 1, wherein:
    the first, second and third groups of initializations are set in a predetermined manner; and
    all operations included in the I/O initialization are included in any one of the first, second and third groups of initializations.

3. The apparatus as set forth in claim 1, wherein the first group of initializations is set in such a manner simpler than those in which the second and third groups of initializations are set that a wait time up to a time when a next initialization is executable is set longer.

4. The apparatus as set forth in claim 1, wherein the second initialization means executes the second group of initializations, divided into a plurality of steps whose number depends upon the dependency relation, by executing the initializations in parallel with each other in each of the steps.

5. The apparatus as set forth in claim 4, wherein the second initialization means synchronizes the steps with each other by a barrier, wait until all the initializations included in a step and which are to be done in parallel with each other are completed and then execute initializations included in a next step in parallel with each other.

6. The apparatus as set forth in claim 1, wherein the third initialization means executes the initializations while being synchronous with a user program with the user of an synchronization object as necessary.

7. An information processing method with execution of I/O initialization of an operating system, the method comprising:
    a first initialization for performing, serially in a predetermined sequence and in a first state in which no threads are usable, a first group of initializations included in an I/O initialization and executable in the first state;
    a second initialization for performing, after the first initialization performs the first group of initializations, using threads, in a sequence depending upon a dependency relation of devices to be initialized and in a second state in which the threads are usable, a second group of initializations included in the I/O initialization, different from the first group of initializations and executable in the second state; and
    a third initialization for performing, after the second initialization performs the second group of initializations, using the threads and in a third state in which a user process is usable, a third group of initializations included in the I/O initialization and different from the first and second groups of initializations.

8. The method as set forth in claim 7, wherein:
    the first, second and third groups of initializations are set in a predetermined manner; and
    all operations included in the I/O initialization may be included in any one of the first, second and third groups of initializations.

9. The method as set forth in claim 7, wherein the first group of initializations is set in such a manner simpler than those in which the second and third groups of initializations are set that a wait time up to a time when a next initialization is executable is set longer.

10. The method as set forth in claim 7, wherein the second initialization executes the second group of initializations, divided into a plurality of steps whose number depends upon the dependency relation, by executing the initializations in parallel with each other in each of the steps.

11. The method as set forth in claim 10, wherein the second initialization synchronizes the steps with each other by a barrier, wait until all the initializations included in a step and which are to be done in parallel with each other are completed and then execute initializations included in a next step in parallel with each other.

12. The method as set forth in claim 7, wherein the third initialization means executes the initializations while being synchronous with a user program with the user of an synchronization object as necessary.

13. A computer readable medium including a computer readable program allowing a computer to execute I/O initialization of an operating system, the computer readable program comprising:
    a first initialization for performing, serially in a predetermined sequence and in a first state in which no threads are usable, a first group of initializations included in an I/O initialization and executable in the first state;
    a second initialization for performing, after the first initialization performs the first group of initializations, using threads, in a sequence depending upon a dependency relation of devices to be initialized and in a second state in which the threads are usable, a second group of initializations included in the I/O initialization, different from the first group of initializations and executable in the second state; and
    a third initialization for performing, after the second initialization performs the second group of initializations, using the threads and in a third state in which a user process is usable, a third group of initializations included in the I/O initialization and different from the first and second groups of initializations.

14. The computer readable medium including a computer readable program as set forth in claim 13, wherein:
the first, second and third groups of initializations are set in a predetermined manner; and
all operations included in the I/O initialization may be included in any one of the first, second and third groups of initializations.

15. The computer readable medium including a computer readable program as set forth in claim 13, wherein the first group of initializations is set in such a manner simpler than those in which the second and third groups of initializations are set that a wait time up to a time when a next initialization is executable is set longer.

16. The computer readable medium including a computer readable program as set forth in claim 13, wherein the second initialization executes the second group of initializations, divided into a plurality of steps whose number depends upon the dependency relation, by executing the initializations in parallel with each other in each of the steps.

17. The computer readable medium including a computer readable program as set forth in claim 16, wherein the second initialization synchronizes the steps with each other by a barrier, wait until all the initializations included in a step and which are to be done in parallel with each other are completed and then execute initializations included in a next step in parallel with each other.

18. The computer readable medium including a computer readable program as set forth in claim 13, wherein the third initialization executes the initializations while being synchronous with a user program with the user of an synchronization object as necessary.

* * * * *